J. O. LUTHY.
CARBURETOR FLOAT.
APPLICATION FILED FEB. 5, 1920.

1,427,306.

Patented Aug. 29, 1922.

UNITED STATES PATENT OFFICE.

JOSEPH O. LUTHY, OF SAN ANTONIO, TEXAS.

CARBURETOR FLOAT.

1,427,306. Specification of Letters Patent. Patented Aug. 29, 1922.

Application filed February 5, 1920. Serial No. 356,488.

*To all whom it may concern:*

Be it known that I, JOSEPH O. LUTHY, a citizen of the Republic of Switzerland, residing at San Antonio, in the county of Bexar and State of Texas, have invented certain new and useful Improvements in Carburetor Floats; and I do hereby declare the following to be a full, clear, and exact description of the invention, such as will enable others skilled in the art to which it appertains to make and use the same.

This invention relates to carburetor floats and has as its primary object to provide a float without seams or joints in the body portion thereof below the water line, but presents an unbroken surface to the liquid of immersion so that the pitting and detorialion of the metal at the joints and seams, due to the action of the fluid on the ordinary type of carburetor floats, will be wholly obviated.

A further object of the invention is to provide a simple, effective and cheap form of float that is wholly non-corrodible, and remains fluid tight under all conditions of use.

Heretofore, it has been customary to make carburetor floats of cork or similar porous material, and later, when the cork proved wholly ineffective, a jointed hollow metal body was employed, and, as indicated, the seams or joints extended below the fluid level, and the action of the fluid on the material of the joints produced fine pin holes in the metal and admitted the fluid to the interior of the float, thereby destroying the utility of the latter. Various attempts to improve the metal float, such as the provision of a metal coating for the exterior thereof, were made, but all such expedients proved to be only temporary remedies, and frequently it occurred that the metal coating actually increased the corroding action and pitting of the float, apparently due to electrolytic action. According to the present invention all of these difficulties are obviated and there is provided a float in which no seam or joint exists below the level of the liquid or fluid, so that when metal is employed, the possibility of corrosion and pitting of the shell is reduced to a minimum, and when a non-corrodible substance is employed to constitute the body of the float, opportunity for leakage of the fluid into the float in the joints is wholly avoided.

The invention is illustrated in the accompanying drawings in which:—

Figure 1:
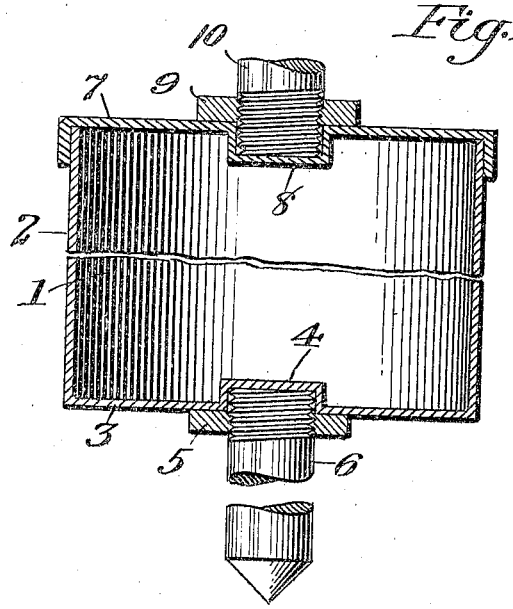

Fig. 1. is a vertical sectional elevation of a float, made of sheet metal in accordance with the invention.

Figure 2:
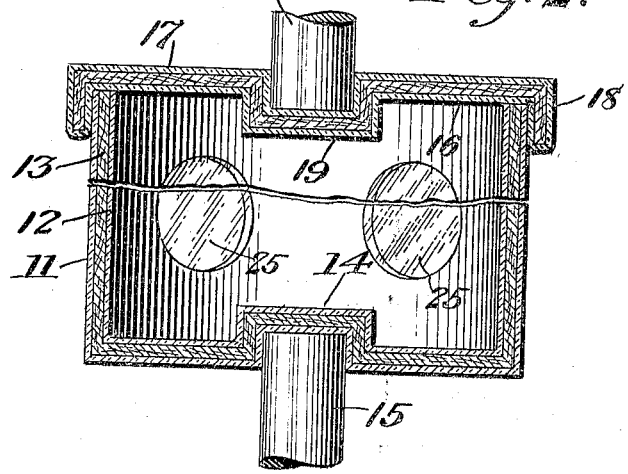

Fig. 2. is a similar view, illustrating a modified form of float in which the body portion is formed of a fabricated core, coated with celluloid, or the like.

Referring to Fig. 1. of the drawings which is to be regarded as being merely typical or exemplary, the numeral 1 represents the hollow body portion of the float which is preferably made of sheet metal, spun or stamped to a generally cup-shaped configuration with integral side wall 2 and bottom 3. Preferably a socket 4 is pressed or otherwise formed in the bottom of the body portion and a nut 5 is secured to the outer face of the bottom with its opening in alignment with socket 4 to admit of the lower section 6 of the stem of the needle valve being secured to the float 1, the upper end of the stem 6 extending into the socket 4 as shown. This affords a strong, rigid connection between the stem and the needle valve. A cover 7 provided with marginal flanges is secured and closes the top of the body portion being made fluid-tight by any suitable means, as by soldering, brazing, or welding. In the center of the cover there is formed a socket 8, similar to socket 4 in the body portion, about the marginal edges of which is secured a nut 9, which receives the lower end of the guide stem 10, which is screw-threaded into the nut and extends into the socket 8 as shown.

In use, the body portion of the float is partially submerged in the fluid of flotation but the level of the fluid never reaches the joints between the body portion 1 and the cover 7, but on the contrary all that portion of the float which is submerged or wet by the fluid is without joint or break in the texture of the metal body portion, so that no local action on the body of the float is induced by the fluid and the tendency of the float to become corroded or pitted is wholly obviated. It will also be noted that the valve stem does not pass through the float, but is secured in two portions, to-wit, a lower section and an upper guide section, to the top and bottom of the float by the simple expedient of screwing the stem sections into the nuts 5 and 9, thereby avoiding the tendency of carburetor floats of metal and the like, as heretofore constructed, to leak at the joints between the stem and body portions.

In the form of the invention illustrated in Fig. 2 of the drawings the body and cover of the float is preferably made of fibrous material, such as pressed card board, molded paper board, or the like, which is coated exteriorly and interiorly with celluloid, or, conversely, these members consist of exterior and interior walls of celluloid, provided with a fiber filler. For example, the body portion consists of the cup-like member, similar to that shown in the Fig. 1, having an exterior celluloid wall, 11, and an interior celluloid wall 12, and an intermediate filler 13, of fibrous material such as pressed cardboard or the like, the several layers forming the composite body portion being fastened together by any suitable cement. In the bottom of the body portion is provided socket 14 adapted to receive the end of the valve stem 15 which is secured in the socket by cement or by softening the celluloid in the socket by a solvent and pressing the end of the valve stem into engagement therewith. The cover or closure for the body portion is also preferably formed of an interior fibrous filling 18 between two enveloping layers 16 and 17, of celluloid, or the like, said cover portion being provided with a socket 19 in which the lower end of the guide member 20 of the valve stem is secured. The cover is attached to the body portion in any suitable manner as by coating the contacting faces of the celluloid with amyl acetate and bringing the parts to be joined together with sufficient pressure to insure a joint with the softened sections of the celluloid. Preferably the celluloid coat of the body portion is transparent and sections of the filler 13 at or about the normal fluid level when the float is in operative position in the tank are cut out to provide windows or openings 25 through which the interior of the float may be observed. The advantage of this arrangement is to enable the user to see whether any liquid has gained access to the interior of the float, which would derange the normal functioning of the latter.

The principal advantages of this latter form of invention is the facility with which the floats may be made, the relatively low cost of the entire structure and the absolute imperviousness of the interior and exterior coats to corrosion by liquids of any character employing floats of this type, as in carburetors for internal combustion engines, for example. The construction of the float insures practical immunity to leakage so that the buoyancy of the float will be maintained constant and the fluid level in the carburetor may also be accurately maintained.

What I claim is:—

1. A carburetor float having a seamless body portion and a cover secured thereto above the fluid level when the float is in operative position in the tank, said cover and body portion having valve stem receiving sockets formed integral therein.

2. A carburetor float having a seamless body portion and a cover secured thereto above the fluid level when the float is in operative position in the tank, said cover and body portion having means therein for securing the valve stem sections thereto.

3. A float comprising a cup-shaped body portion having a core of fibrous material provided with openings at or about the water level when the float is in operative position in the tank, an imperforate coating of celluloid on said body portion, a cover secured to the body portion, and valve stem sections secured in the body and cover portions.

4. A carburetor float comprising a body portion of fibrous material, a cover therefor also of fibrous material and a coating of celluloid applied to both, said cover and body portion having valve stem receiving sockets formed integral therewith.

5. A carburetor float having a seamless body portion and a cover secured thereto above the fluid level when the float is in operative position in the tank, the exposed surfaces of which are provided with a coating of celluloid, said cover and body portion having valve stem receiving sockets formed integral therein.

In testimony whereof I affix my signature.

JOSEPH O. LUTHY.